June 18, 1957  A. H. JOSEPH  2,796,095
CLAMPING MACHINE WITH FLEXIBLE BAND WORK ENGAGING MEANS
Filed Nov. 29, 1952  4 Sheets-Sheet 1

INVENTOR.
Allan H. Joseph.
BY
Thiess, Olsen, Mecklenburger, von Holst & Coltman
Attys.

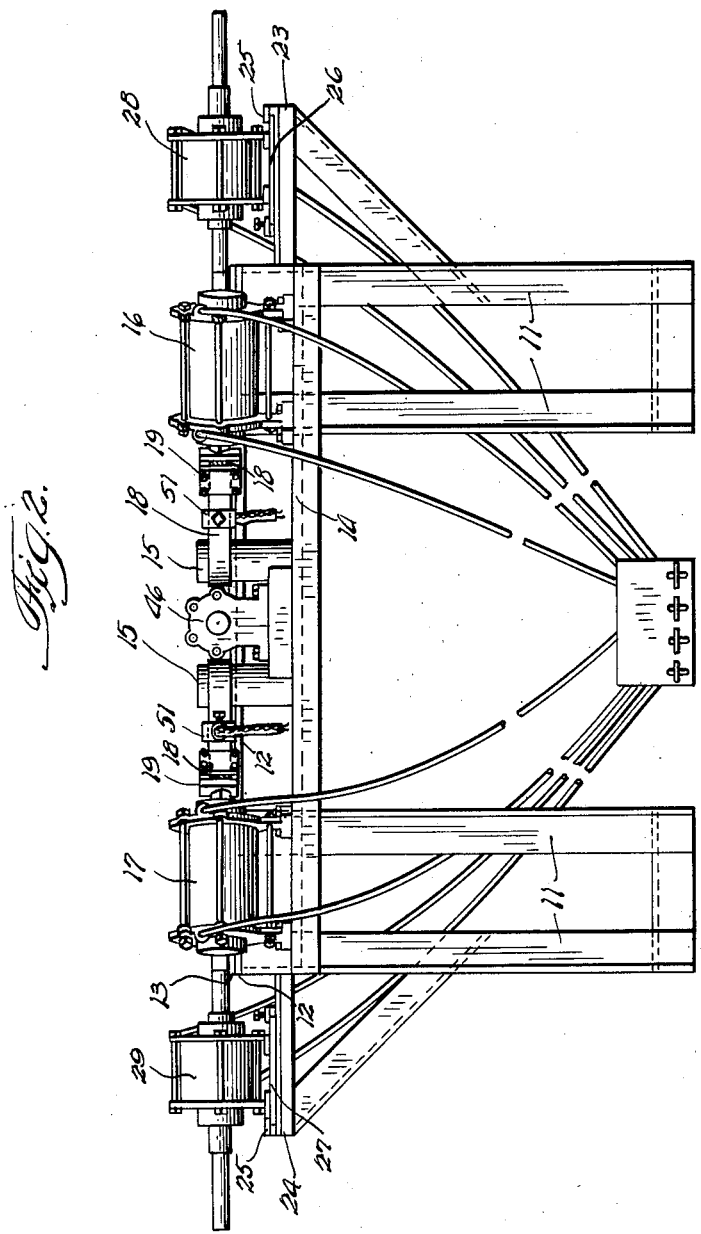

June 18, 1957 A. H. JOSEPH 2,796,095
CLAMPING MACHINE WITH FLEXIBLE BAND WORK ENGAGING MEANS
Filed Nov. 29, 1952 4 Sheets-Sheet 3
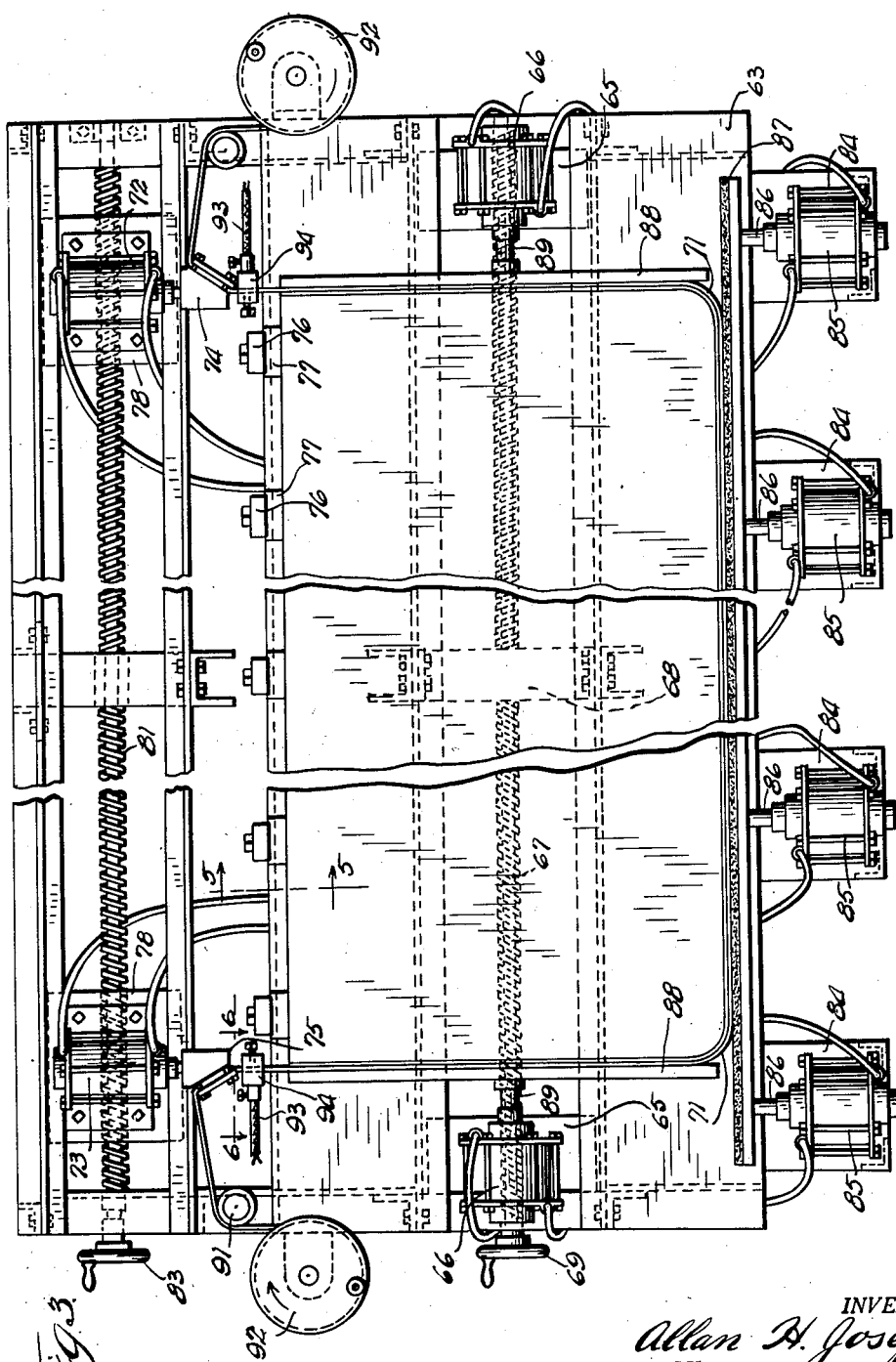
INVENTOR.
Allan H. Joseph.
BY
Thiess, Olson, Mecklenburger, von Holst, Coltman.
Attys.

June 18, 1957 A. H. JOSEPH 2,796,095
CLAMPING MACHINE WITH FLEXIBLE BAND WORK ENGAGING MEANS
Filed Nov. 29, 1952 4 Sheets-Sheet 4
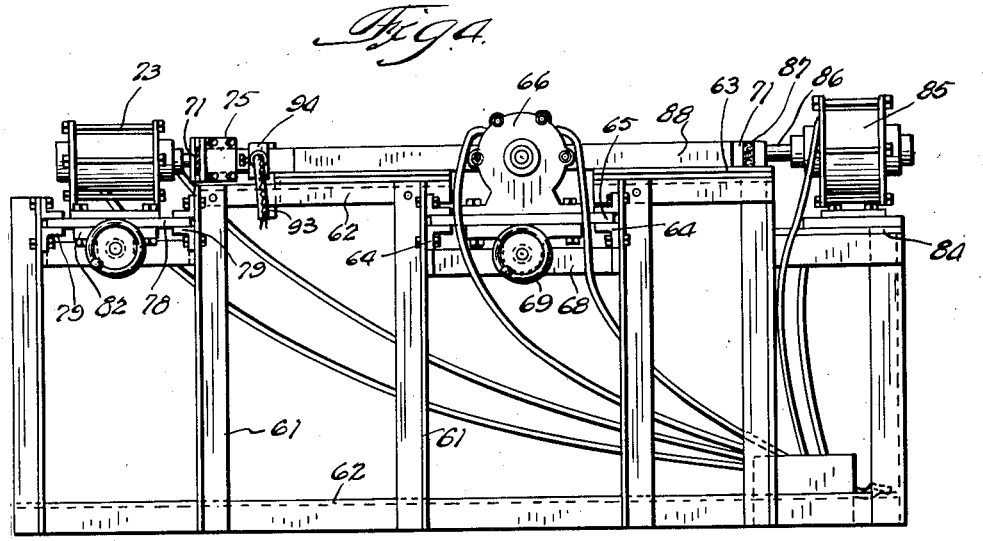
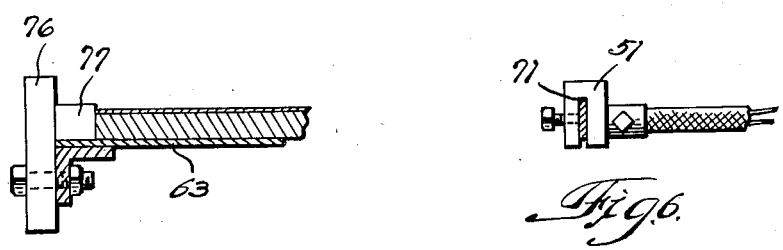
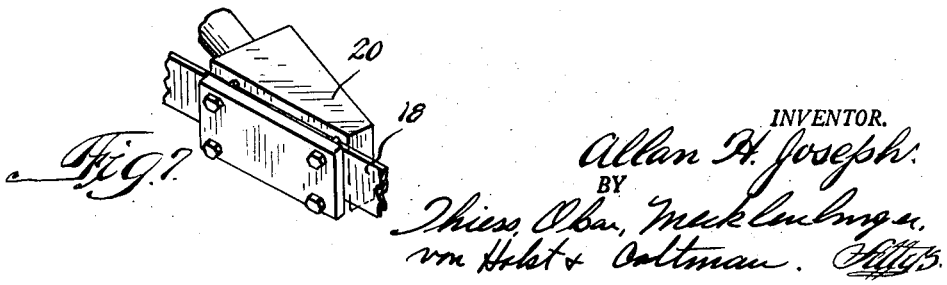
INVENTOR.
Allan H. Joseph

2,796,095

Patented June 18, 1957

UNITED STATES PATENT OFFICE

2,796,095

CLAMPING MACHINE WITH FLEXIBLE BAND WORK ENGAGING MEANS

Alan H. Joseph, Chicago, Ill., assignor to Handy Manufacturing Company, Chicago, Ill., a corporation of Illinois Application November 29, 1952, Serial No. 323,177

7 Claims. (Cl. 144—291)

The present invention relates to a clamping machine and has special reference to a machine for attaching suitable edging material to the edges of tables, desks, and other articles.

More particularly this invention relates to a clamping machine for attaching thin strips of material such as wood or plastic veneers to the edges of tables, desks, etc., by thermoplastic or thermosetting adhesives.

The present clamping machine may be employed for edge banding objects of almost any peripheral shape such as square, rectangular, round, oval, square or rectangular with round corners, or irregular with concave and convex peripheral portions. Moreover, it may be easily and quickly adjusted for handling articles of different sizes and shapes.

The clamping machine of the present invention preferably comprises a substantially horizontal, work-supporting structure, such as a table which may be rectangular in shape and of sufficient size to support thereon the largest articles or workpieces to be treated. A strong, thin, flexible band preferably of electrically conducting material, such as stainless steel, of a length to fit about workpieces to be treated, is supported on the table. The ends of this band are connected to suitable takeup members, such as pneumatic cylinders, located adjacent one side of the table. The band is arranged in a vertical position about the edge of the workpiece with the veneer in place and is then pulled tight against the edges of the workpiece by actuation of the takeup members. Suitable stop means are employed to limit movement of the workpiece upon actuation of the takeup members. By connecting a source of electrical energy to the opposite ends of the strip, it acts as a resistance element and supplies sufficient heat to set the adhesive and thus permanently secure the veneer in place. If any portions of the periphery of the work-piece are flat or concave, pressure members of the desired shape are employed to force the strip tightly against such portions of the workpiece.

The present clamping machine may be employed to attach veneer entirely about the peripheral edges of a member or partially thereabout, where this is all that is required, as in the case of certain dinette and sink tops. If the veneer is to be secured entirely about the object, the end portions of the strip pass between adjacent guide members at one side of the supporting element before being secured to the takeup members. However, when the veneer is to be applied only partially about the workpiece, the takeup members may be substantially aligned with the sides of the workpiece to pull the end portions of the strip directly toward the takeup members.

While the present clamping machine is intended primarily to edge band objects having rounded peripheries, it may be used to edge band objects of square or rectangular shape by applying the veneer to only two opposite edges at a time.

An object of the present invention is to provide a clamping machine for the edge banding of articles of various shapes and sizes including those having both concave and convex peripheries.

Another object is to provide such a clamping machine that will apply heat and pressure to the veneer edging throughout its length.

A further object is to provide an edge band clamping machine which may be adjusted with a minimum of time and effort to treat workpieces of different shapes and sizes.

Still another object is to provide an edge band clamping machine which may be operated by a relatively unskilled operator from a single location.

Further objects and advantages will be apparent from the following description and claims when considered with the accompanying drawings, in which:

Fig. 2 is a side elevational view of the clamping table shown in Fig. 1;

Fig. 3 is a top plan view of another form of clamping table embodying the present invention;

Fig. 4 is an end elevational view of the clamping table shown in Fig. 3;

Fig. 5 is a cross-sectional view taken on the line 5—5 of Fig. 3;

Fig. 6 is a cross-sectional view taken on the line 6—6 of Fig. 3; and

Fig. 7 is a perspective view of a clamping member for engaging the end portions of the flexible strip used with the clamping table.

Figure 1:
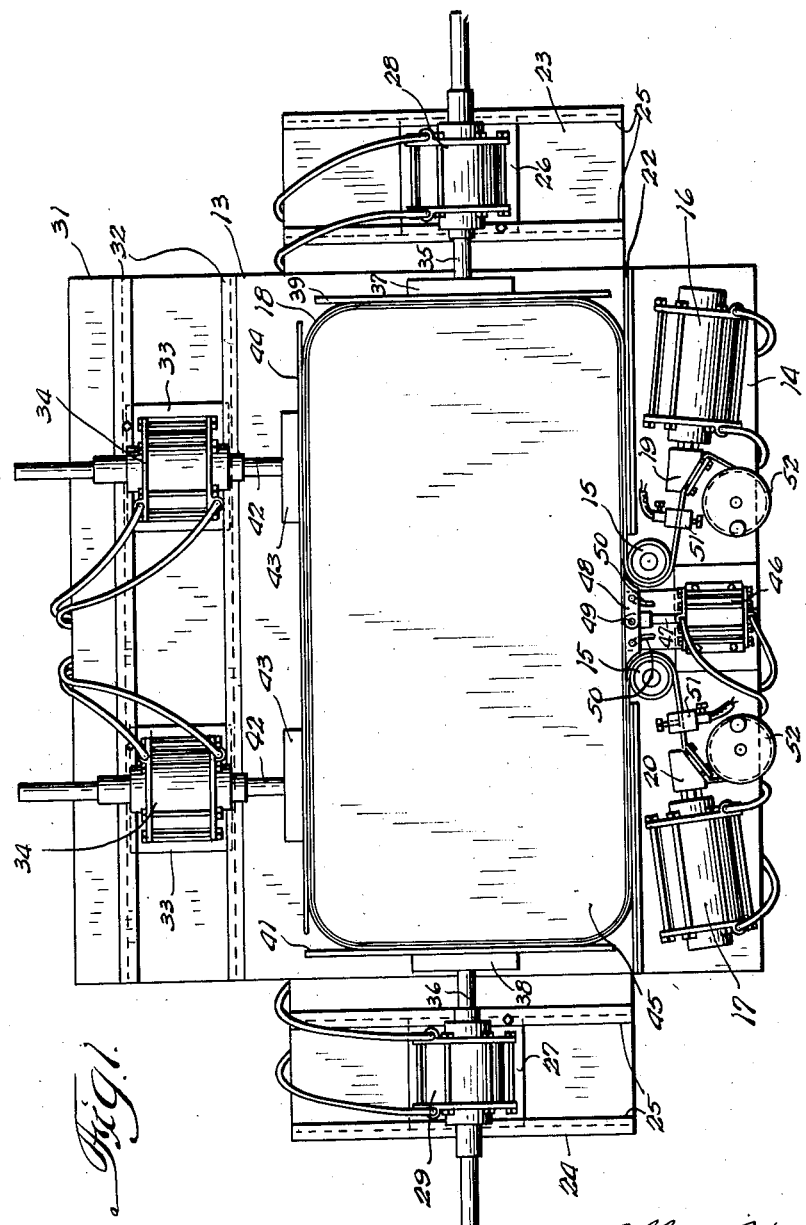
Fig. 1 is a top plan view of a clamping table embodying the present invention.

Referring to the drawings and particularly to Figs. 1 and 2, there is shown a clamping table embodying the present invention for attaching veneer strips entirely around the edges of articles such as table tops, desk tops and the like. This machine comprises a supporting base which may be formed of upright angle iron members 11 and horizontally extending members 12 welded to the upper ends of the members 11 to form a strong structure. A work-supporting top 13 is preferably mounted on the horizontally extending members 12 so that it may be removed and replaced when desired. The top 13 may be made of any suitable material such as plywood, pressed board or the like.

At each side of the supporting top 13 and a distance below the surface thereof, there is a shelf or ledge upon which are mounted parts of the actuating mechanism. A pair of vertical idler rolls 15 is located on the ledge 14 adjacent the front edge of the table. Pneumatic cylinders 16 and 17 are also mounted on the front ledge 14 adjacent the ends thereof, with their piston rods extending in the general direction of the rolls 15.

A thin, strong, flexible strip 18 having a width as great as that of the edges to be banded is vertically positioned on the supporting table 13 with the free ends thereof extending outwardly between the idler rolls 15. One end is attached to a clamp 19 on the forward end of the piston rod of the pneumatic cylinders 16. The other free end of the strip 18, after passing about its roll 15 is connected to the clamp 20 on the end of the piston rod of the pneumatic cylinder 17. The strip 18 is preferably formed of an electrically conducting metal, such as tempered stainless steel. It may be on the order of .020 inch thick, but must have sufficient tensile strength to withstand the pull of the pneumatic cylinder thereon as hereinafter explained. The strip 18 is long enough to be looped entirely about the largest workpiece to be treated in the machine, with the ends thereof passing about the idler rolls 15 and being connected to the clamps 19 and 20.

At the front edge of the table there is an abutment wall or barrier 22 which extends from adjacent the idler rolls outwardly to the opposite ends of the table. It limits movement of the workpiece toward that side of the table.

The end supporting shelves 23 and 24 extend from the front of the table rearwardly beyond the central line of the table and are provided with longitudinal ways 25 in which supporting plates 26 and 27 are guided. Pneumatic cylinders 28 and 29 are mounted on the plates 26 and 27 respectively with the piston rods thereof extending substantially normal to the adjacent sides of the table. The rear supporting ledge 31 is provided with guide ways 32 similar to the guide ways 25 for the plates 33 on which are mounted pneumatic cylinders 34.

All of the cylinders 28, 29 and 34 are preferably of the type disclosed in my Patent No. 2,623,560 dated December 30, 1952, and have piston rods which are longitudinally adjustable with respect to the pistons and cylinders. The pneumatic cylinders 34 are mounted so that the piston rods thereof are substantially normal to the rear side of the table top 13. Each of these cylinders as well as the cylinders 16 and 17 are double-acting so that the pistons may be positively moved in both directions. Air or other fluid is supplied to the cylinders through suitable conduits.

The pneumatic cylinders 28 and 29 are provided with piston rods 35 and 36 having pressure plates 37 and 38 on the ends thereof. Removably connected to the pressure plates 37 and 38 are pressure shoes 39 and 41 for abutting the strip 18 on the workpiece to be operated upon. The piston rods 42 of the pneumatic cylinders 34 are also provided at their forward ends with pressure plates 43. Removably attached to the pressure plates 43 is a common pressure shoe 44. However, if desired, separate pressure shoes may be carried by the pressure plates 43.

A workpiece 45 to be edge banded is placed on the table within the loop of the thin, flexible strip 18 and the free ends of the strip are connected to the clamps 19 and 20 when the piston rods of the cylinders 16 and 17 are extended outwardly. In edge banding table tops and other articles, thin strips of wood or plastic veneer may be employed. The plastic veneers may be of the type made with urea and pheno-formaldehyde resins absorbed in a fibrous base. These are sold under various names, such as "Formica" and "Micarta."

After the loop 18 has been placed about the workpiece, the veneer with a suitable adhesive applied thereto, preferably of the thermosetting type, is positioned adjacent the edges of the workpiece. The cylinders 16 and 17 are then actuated simultaneously to take up on the strip 18. If the workpiece is round or oval so that all portions of the periphery are convex, retracting the piston rods into the cylinders 16 and 17 will cause the strip 18 to press all portions of the veneer contacted thereby against the edge of the workpiece with a positive pressure. If, however, the workpiece 45 is provided with straight peripheral portions as shown in Fig. 1, retracting the pistons in the cylinders 16 and 17 will not cause the strip to apply a positive pressure to the flat surface of the workpiece, but will only cause contact. Therefore, to provide the required pressure the cylinders 28, 29 and 34, after being properly located along their respective guides, are actuated to force the pressure shoes 37, 38 and 44 against the strip 18. As the workpiece is pulled against the ledge 22 by the actuation of the cylinders 16 and 17, pressure will be applied to the straight portions of the strip on all sides of the workpiece, except between the rolls 15.

A pressure member is also provided for contacting the strip 18 intermediate the rolls 15. This may comprise a pressure cylinder 46 mounted on the shelf 14 having a piston rod 47 extending inwardly therefrom. A pressure shoe 48 on the inner end thereof may comprise two end portions pivoted at 49 to the end of the piston rod 47. This is to permit the ends of the pressure shoe 48 to pivot toward each other and pass between the idler rolls 15 when the piston rod 47 is retracted. However, when the piston rod 47 is extended, the pressure shoe 48 will engage substantially the entire length of the strip 18 between the rolls 15. The movement of the ends of the pressure shoe 48 may be controlled by pins on the bottom thereof riding in the slots 50.

If the workpiece has concave peripheral portions, such for example as a kidney-shaped table, the pressure shoes will be provided with a shape complementary to the portion of the workpiece periphery opposite them. Upon operation of the various pneumatic cylinders 28, 29 and 34 the pressure shoes will force the strip 18 against the periphery of the workpiece.

In order to provide the required heat for setting the thermosetting adhesive, contacts 51 connected to a suitable source of electrical energy are tightly attached to the end portions of the strip 18. In order to eliminate danger of injury from accidental contact with the strip, a relatively low voltage may be employed. As the strip 18 is preferably of stainless steel or other conducting material it acts as a resistance element intermediate the clamps 51 to heat and set the adhesive.

Instead of employing an electrically conducting strip 18, the strip may be of other material with a resistance element or other heating means associated therewith. When the strip 18 is of conducting material, the pressure shoes 39, 41 and 44 and the abutment ledge 22 are either made of insulating material or are insulated by other means from the strip 18. Likewise, the rolls 15 and clamps 19 are insulated from the strip.

Takeup reels 52 may be provided for receiving the ends of the strip 18. These are preferably spring type reels which automatically take up any slack provided. They also should be insulated from the strip 18.

The present clamping machine is intended for control by a single operator. The operator's station as shown particularly in Fig. 2 is preferably at the front of the machine. In addition to a main switch for controlling the current to the contacts 51, four control valves are preferably provided. One controls the supply of air or other fluid through the conduits to the cylinders 16 and 17. A second controls the cylinders 28 and 29. A third controls the cylinder 34 and a fourth controls the cylinder 46.

To operate the clamping table shown in Figs. 1 and 2 the piston rods in the cylinders 16 and 17 are extended and the pistons in cylinders 28, 29 and 34 are retracted. A workpiece is then inserted in the loop of the strip 18. Thereupon, the control for the cylinders 16 and 17 is actuated to retract the piston rods therein and tighten the strip 18 about the workpiece. The controls for the cylinders 28, 29 and 34 are next actuated to bring the pressure shoes against the strip. For workpieces with concave peripheral portions, a different sequence of operations may be required. Finally the pressure shoe 48 is forced against the workpiece.

The machine may be very easily and quickly adjusted for clamping workpieces of different sizes and shapes. For a change in size it is only necessary to relocate the clamps 19, 20 and 51 on the ends of the strip 18. However, if the shape of the workpiece is also altered so that the usual straight pressure shoes cannot be used, it will be necessary to replace one or more of the pressure shoes as required. As the strip 18 is preferably kept hot the adhesive will set quickly so that the whole operation may be carried out with a minimum of time and effort.

Another form of clamping machine embodying the present invention shown in Figs. 3 and 4, is intended primarily for the partial edge banding of relatively long narrow articles, where the length may be four or five times the width. This machine may comprise a supporting base consisting of upright angle iron members 61, cross-bracing members 62 and a split table top or other work-supporting member 63.

The table is divided longitudinally into two parts with a space or channel formed between the two central rows of uprights 61. Guide ways 64 are mounted on the inner sides of the two central rows of uprights 61 for receiving a supporting plate 65 adjacent each end upon which is carried a pneumatic cylinder 66. A threaded rod 67 extending longitudinally of the table in the central channel is mounted in bearings adjacent the ends of the table and also has a reduced portion mounted in a central bearing 68. On each side of the central bearing the rod is oppositely threaded. Projecting downwardly from each of the plates 65 is an internally threaded member which fits over the rod 67 therebeneath. A hand wheel 69 is fixed on one end of the rod 67 for rotating the same. Rotation of the rod 67 moves the cylinders 66 at opposite ends of the table toward or away from each other depending on the direction of the rotation of the rod. In this way the table may be employed to operate upon workpieces which vary greatly in length.

The clamping table disclosed in Figs. 3 and 4 is intended primarily for the partial edge banding of articles, leaving at least one side uncovered. Sinks, tables, etc., are frequently provided with a folding lip or apron which is banded only on the outer exposed edges, and the present device is suitable for banding such articles.

A thin flexible strip 71 is also provided in this form of clamping table. However, the ends of the strip after passing over the ends of the articles are directly connected to the pistons of pneumatic cylinders 72 and 73 by clamps 74 and 75. Movement of the workpiece toward the cylinders 72 and 73 is limited by a series of stop members 76 which may be removably bolted to the front edge of the table top 63 as shown in Fig. 5. Whenever the workpiece is narrower than the table, suitable spacing blocks 77 may be positioned between the edge of the workpiece and the stop members 76 so that the workpiece is substantially centered with respect to the table.

The pneumatic cylinders 72 and 73 are arranged so that they may be adjusted longitudinally of the table. In this way they may be positioned opposite the ends of workpieces of various lengths as illustrated in Fig. 3. For this purpose they are mounted on plates 78 which slide in the guide ways 79 arranged at the front of the table. A reversely threaded rod 81 mounted in suitable bearings and prevented from longitudinal movement passes through the internally threade sleeve portions 82 secured to the lower side of the plates 78. The rod 81 may be rotated by a hand wheel 83 fixed at one end to simultaneously move the cylinders 72 and 73 toward or away from each other.

A plurality of cylinder supports 84 are placed at the rear of the table a distance below the top 63. Mounted on each support 84 is a pneumatic cylinder 85 having piston rods 86 projecting toward the opposite side of the table. A pressure shoe 87 preferably of insulating material, or having its contacting face insulated from the cylinder, is mounted on the ends of the pistons 86. Insulated pressure plates 88 are also mounted on the piston rods 89 of the end cylinders 66. As in the previous clamping table, the pressure plates are straight if the peripheral edge portions of the work pieces opposite thereto are straight. However, if the edges of the workpieces are concave the pressure plates opposite thereto will be provided with a complementary shape.

In using the clamping table shown in Figs. 3 and 4 a workpiece is placed in the loop formed by the flexible strip 71 with the side which is not to be banded contacting the stops 76 or the spacer blocks 77 when they are employed. The spacer blocks are of a size to substantially center the workpiece transversely of the table. The free ends of the strip 71 are connected to the clamps 74 and 75 of the cylinders 72 and 73 which are then actuated to tighten the strip about the workpiece. If the cylinders 72 and 73 are not substantially opposite the ends of the workpiece they are properly positioned by rotation of the threaded shaft 81 by the handle 83. The threaded shaft 67 is then rotated to bring the pressure plates 88 adjacent the ends of the workpiece when the pistons of these cylinders are in retracted position. Thereafter the cylinders 66 are actuated to extend the piston rods and force the pressure plates 88 against the ends of the workpiece. The cylinders 85 are also actuated to force the pressure shoe 87 against the adjacent edge of the workpiece. Should the workpiece be substantially narrower than the table a suitable spacing member may be positioned between the piston rods 86 and the pressure shoe 87 actuated thereby.

The free ends of the strip 71 are preferably guided about rolls 91 to reel boxes 92 thus preventing the ends of the strip from getting in the way.

Conductors 93 connected to a low voltage source of electrical energy are tightly secured to the end portions of the strip 71 by clamps for heating the strip sufficiently to set the adhesive.

This form of clamping table may also be readily operated by a single operator standing at the rear of the table. The controls for the air supply lines of the various cylinders will also be located here. In a preferred form one control will serve to actuate the cylinders 72 and 73. The second will actuate the cylinders 66 and the third will actuate the cylinders 85.

Instead of using two takeup members, such as the cylinders 16 and 17 or 72 and 73, it may be possible under certain conditions to secure one end of the strip to a fixed support and employ only a single takeup member to pull the strip about the workpiece.

The clamping machines embodying the present invention may be used to edge band workpieces of almost any desired size and shape. They may be readily adjusted to handle different workpieces. Through the use of the flexible strip all parts of the veneer being attached to the edge of the workpiece are pressed tightly thereagainst and are heated sufficiently to set the adhesive. The whole pressing operation may therefore be accomplished with a minimum of time and effort.

While particular embodiments of this invention have been illustrated and described, it will be understood, of course, that the invention is not to be limited thereto, since many modifications may be made, and it is contemplated therefore by the appended claims to cover any such modifications as fall within the true spirit and scope of this invention.

I claim:

1. A clamping machine comprising a work-supporting structure, a strong flexible strip of material for engaging a substantial portion of the peripheral edges of a workpiece on said supporting structure, a pair of takeup members for connection to the end portions of said strip for pulling the strip against said edges of the workpiece, said takeup members being adjustably mounted for movement longitudinally of said supporting structure to permit their being substantially aligned with the ends of said workpiece for exerting a direct pull on said strip, and stop means associated with said supporting structure for limiting movement of said workpiece upon actuation of said takeup members.

2. A clamping machine comprising a work-supporting structure, a strong flexible strip of material for engaging a substantial portion of the peripheral edges of a workpiece on said supporting structure, a pair of takeup members for connection to the end portions of said strip for pulling the strip against said edges of the workpiece, said takeup members being substantially aligned with the ends of said workpiece for exerting a direct pull on said strip, stop means associated with said supporting structure for limiting movement of said workpiece upon actuation of said takeup members, and pressure members at the opposite ends of said supporting structure adjustable longitudinally of said structure for urging said strip against the ends of workpieces of different lengths.

3. A clamping machine comprising a work-supporting structure, a strong flexible strip of material for engaging a substantial portion of the peripheral edges of a workpiece on said supporting structure, a pair of takeup members for connection to the end portions of said strip for pulling the strip against said edges of the workpiece, said takeup members being adjustably mounted for movement longitudinally of said supporting structure to permit their being substantially aligned with the ends of said workpiece for exerting a direct pull on said strip, stop means associated with said supporting structure for limiting movement of said workpiece upon actuation of said takeup members, and pressure members at the opposite ends of said supporting structure adjustable longitudinally of said structure for urging said strip against the ends of workpieces of different lengths.

4. A clamping machine comprising a work-supporting structure having a substantially planar work-supporting surface portion, a strong flexible strip of material for being arranged on said surface portion in a loop to receive a workpiece therein, said strip being of a width not substantially less than the peripheral thickness of said workpiece and having a substantially flat work-engaging surface extending from and substantially normal to said work-supporting surface portion for directly engaging the periphery of said workpiece, means for tightening said strip about said workpiece comprising at least one take-up member for connection to an end portion of said strip for pulling said strip against the edges of said workpiece, and pressure members associated with said supporting structure positioned outwardly of said strip and movable substantially parallel to said surface portion toward portions of said strip for urging said strip against the edges of said workpiece, and means for actuating said pressure members.

5. A clamping machine comprising a work-supporting structure having a substantially planar work-supporting surface portion, a thin strong flexible strip of electrically conducting material for being arranged on said surface portion in a loop to receive a workpiece therein, said strip being of a width not substantially less than the peripheral thickness of said workpiece and having a substantially flat work-engaging surface extending from and substantially normal to said work-supporting surface portion for directly engaging the periphery of said workpiece, means for tightening said strip about said workpiece comprising at least one take-up member for connection to an end portion of said strip for pulling said strip against the edges of said workpiece, pressure members associated with said supporting structure positioned outwardly of said strip and movable substantially parallel to said surface portion toward portions of said strip for urging said strip against the edges of said workpiece, means for actuating said pressure members, and a source of electrical energy for connection to opposite end portions of said strip for heating the same.

6. A clamping machine comprising a work-supporting structure having a substantially planar work-supporting surface portion, a strong flexible strip of material for being arranged on said surface portion in a loop to receive a workpiece therein, said strip being of a width not supstantially less than the peripheral thickness of said workpiece, said strip having a substantially flat work-engaging surface extending from and substantially normal to said work-supporting surface portion for directly engaging the periphery of said workpiece, means for tightening said strip about said workpiece comprising at least one take-up member for connection to an end portion of said strip for pulling said strip against the edges of said workpiece, stop means associated with said structure for limiting movement of the workpiece upon actuation of said take-up member, and pressure members associated with said supporting structure positioned outwardly of said strip and movable substantially parallel to said surface portion toward portions of said strip for urging said strip against the edges of said workpiece, and means for actuating said pressure members.

7. A clamping machine comprising a work-supporting structure having a substantially planar work-supporting surface portion, a strong flexible strip of material for being arranged on said surface portion in a loop to receive a workpiece therein, said strip being of a width not substantially less than the peripheral thickness of said workpiece, said strip having a substantially flat work-engaging surface extending from and substantially normal to said work-supporting surface portion for directly engaging the periphery of said workpiece, adjacent guide members at one side of said surface portion for receiving the free ends of the strip therebetween, take-up members outwardly of said guide members for connection to the end portions of said strip for pulling said strip against the edges of said workpiece, and pressure members having a shape complementary to that of the periphery of said workpiece opposite thereto associated with said supporting structure positioned outwardly of said strip and movable substantially parallel to said surface portion toward portions of said strip for urging said strip against the edges of said workpiece, and means for actuating said pressure members.

References Cited in the file of this patent

UNITED STATES PATENTS

| Number | Name | Date |
|---|---|---|
| 54,463 | Dunne | May 1, 1886 |
| 720,816 | Karl | Feb. 17, 1903 |
| 874,406 | Johnson | Dec. 24, 1907 |
| 891,121 | Wichers | June 16, 1908 |
| 1,074,639 | Moore | Oct. 7, 1913 |
| 1,148,713 | Parry | Aug. 3, 1915 |
| 1,252,645 | Baier et al. | Jan. 8, 1918 |
| 1,644,755 | Stephenson | Oct. 11, 1927 |
| 2,182,154 | Lancaster | Dec. 5, 1939 |
| 2,191,230 | Guss | Feb. 20, 1940 |
| 2,193,888 | Sinclair | Mar. 19, 1940 |
| 2,222,615 | Hart | Nov. 26, 1940 |
| 2,308,043 | Bierwirth | Jan. 12, 1943 |
| 2,317,281 | Linquist | Apr. 20, 1943 |
| 2,394,323 | Menke | Feb. 5, 1946 |
| 2,696,232 | Johnson | Dec. 7, 1954 |